(12) United States Patent
Genner et al.

(10) Patent No.: US 11,936,790 B1
(45) Date of Patent: *Mar. 19, 2024

(54) SYSTEMS AND METHODS FOR ENHANCED HASH TRANSFORMS

(71) Applicant: T STAMP INC., Atlanta, GA (US)

(72) Inventors: Gareth Neville Genner, Atlanta, GA (US); Norman Hoon Thian Poh, Atlanta, GA (US)

(73) Assignee: T Stamp Inc., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/956,190

(22) Filed: Sep. 29, 2022

Related U.S. Application Data (63) Continuation of application No. 16/406,978, filed on May 8, 2019, now Pat. No. 11,496,315.

(60) Provisional application No. 62/829,825, filed on Apr. 5, 2019, provisional application No. 62/668,576, filed (Continued)

(51) Int. Cl.
*H04L 9/32* (2006.01)
*G06F 7/483* (2006.01)
*G06F 7/58* (2006.01)
*G06K 19/06* (2006.01)

(52) U.S. Cl.
CPC ............ *H04L 9/3231* (2013.01); *G06F 7/483* (2013.01); *G06F 7/58* (2013.01); *G06K 19/06037* (2013.01); *H04L 9/3242* (2013.01)

(58) Field of Classification Search
CPC ......... H04L 9/3231; G06F 7/483; G06F 7/58; G06K 19/06037; G06K 19/3242
See application file for complete search history.

(56) References Cited

U.S. PATENT DOCUMENTS

| 6,836,554 B1 | 12/2004 | Bolle et al. |
| 7,120,607 B2 | 10/2006 | Bolle et al. |
| 7,412,081 B2 | 8/2008 | Doi |

(Continued)

FOREIGN PATENT DOCUMENTS

| CN | 103930921 A | 7/2014 |
| EP | 3065366 A1 | 9/2016 |

(Continued)

OTHER PUBLICATIONS

Wonjun Kim, Face Liveness Detection From a Single Image via Diffusion Speed Model, IEEE Transactions on Image Processing, vol. 24, No. 8, Apr. 13, 2015, pp. 2456 to 2465.

(Continued)

*Primary Examiner* — Lynn D Feild
*Assistant Examiner* — Abdullah Almamun
(74) *Attorney, Agent, or Firm* — Morris, Manning & Martin, LLP; Daniel E. Sineway, Esq.

(57) ABSTRACT

Systems and methods for enhanced hash transforms are disclosed. In particular embodiments, biometric data is concatenated with non-biometric data for generating a fixed-sized vector, and furthermore performing various permutations and projections on the vector. The resulting vector may be stored in a registry, and a corresponding key may be generated and provided to the user associated with the biometric data. The hash transformation may be a lossy process, such that the resulting hash includes less bytes than the initial biometric data, and a hash reversal fails to generate an exact copy of the original biometric data.

20 Claims, 4 Drawing Sheets

EXEMPLARY HASH TRANSFORM PROCESS

Related U.S. Application Data on May 8, 2018, provisional application No. 62/668,610, filed on May 8, 2018.

(56) References Cited

U.S. PATENT DOCUMENTS

| | | |
|---|---|---|
| 7,773,784 B2 | 8/2010 | Boult |
| 7,822,631 B1 | 10/2010 | Vander Mey et al. |
| 8,010,460 B2 | 8/2011 | Work et al. |
| 8,249,314 B2 | 8/2012 | Bolle et al. |
| 8,312,291 B2 | 11/2012 | Golic et al. |
| 8,316,086 B2 | 11/2012 | Ufford et al. |
| 8,457,367 B1 | 6/2013 | Sipe et al. |
| 8,510,797 B2 | 8/2013 | Kasturi |
| 8,542,879 B1 | 9/2013 | Nechyba et al. |
| 8,675,926 B2 | 3/2014 | Zhang et al. |
| 8,724,856 B1 | 5/2014 | King |
| 8,965,066 B1 | 2/2015 | Derakhshani et al. |
| 9,070,088 B1 | 6/2015 | Baveja et al. |
| 9,147,117 B1 | 9/2015 | Madhu et al. |
| 9,173,101 B1 | 10/2015 | Angelov et al. |
| 9,262,725 B2 | 2/2016 | Butte et al. |
| 9,300,676 B2 | 3/2016 | Madhu et al. |
| 9,477,828 B2 | 10/2016 | Irie |
| 9,495,588 B2 | 11/2016 | Derakhshani et al. |
| 9,521,606 B1 | 12/2016 | Costa et al. |
| 9,652,663 B2 | 5/2017 | Lau et al. |
| 9,679,212 B2 | 6/2017 | Kim et al. |
| 9,721,147 B1 | 8/2017 | Kapczynski |
| 9,838,388 B2 | 12/2017 | Mather et al. |
| 9,866,393 B1 | 1/2018 | Rush et al. |
| 10,019,561 B1 | 7/2018 | Shelton et al. |
| 10,049,287 B2 | 8/2018 | Holz et al. |
| 10,210,388 B2 | 2/2019 | Derakhshani et al. |
| 10,225,255 B1 | 3/2019 | Jampani et al. |
| 10,275,684 B2 | 4/2019 | Han et al. |
| 10,320,569 B1 | 6/2019 | Wentz et al. |
| 10,430,638 B2 | 10/2019 | Russo |
| 10,594,688 B2 | 3/2020 | Yang et al. |
| 10,628,700 B2 | 4/2020 | Puri et al. |
| 10,635,894 B1 | 4/2020 | Genner |
| 10,650,226 B2 | 5/2020 | Chu et al. |
| 10,733,424 B2 | 8/2020 | Son et al. |
| 10,735,205 B1 | 8/2020 | Wentz et al. |
| 10,796,178 B2 | 10/2020 | Fan et al. |
| 10,810,423 B2 | 10/2020 | Thavalengal |
| 11,080,516 B1 | 8/2021 | Joshi et al. |
| 11,080,517 B2 | 8/2021 | Wu et al. |
| 11,093,771 B1 | 8/2021 | Genner |
| 11,095,631 B1 | 8/2021 | Genner |
| 11,151,468 B1 | 10/2021 | Chen et al. |
| 2004/0019570 A1 | 1/2004 | Bolle et al. |
| 2004/0096085 A1 | 5/2004 | Matsumoto et al. |
| 2004/0186906 A1 | 9/2004 | Torrant et al. |
| 2005/0235148 A1 | 10/2005 | Scheidt et al. |
| 2006/0015358 A1 | 1/2006 | Chua |
| 2006/0042483 A1 | 3/2006 | Work et al. |
| 2006/0050937 A1* | 3/2006 | Hamid ............... G06V 40/1347 382/124 |
| 2006/0114520 A1 | 6/2006 | Enomoto et al. |
| 2006/0212931 A1 | 9/2006 | Shull et al. |
| 2007/0174633 A1 | 7/2007 | Draper et al. |
| 2008/0310727 A1 | 12/2008 | Wu et al. |
| 2008/0313714 A1 | 12/2008 | Fetterman et al. |
| 2009/0022374 A1 | 1/2009 | Boult |
| 2009/0080717 A1 | 3/2009 | Dias |
| 2009/0210722 A1 | 8/2009 | Russo |
| 2009/0271634 A1 | 10/2009 | Boult et al. |
| 2009/0310830 A1 | 12/2009 | Bolle et al. |
| 2009/0327054 A1 | 12/2009 | Yao et al. |
| 2010/0017618 A1 | 1/2010 | Golic et al. |
| 2010/0119126 A1* | 5/2010 | Rane ............... G06V 10/28 382/125 |
| 2010/0194919 A1 | 8/2010 | Ishii et al. |
| 2010/0250676 A1 | 9/2010 | Ufford et al. |
| 2011/0099277 A1 | 4/2011 | Yao et al. |
| 2011/0131643 A1 | 6/2011 | Lawrence et al. |
| 2011/0137789 A1 | 6/2011 | Kortina et al. |
| 2011/0246766 A1 | 10/2011 | Orsini et al. |
| 2011/0285748 A1 | 11/2011 | Slatter et al. |
| 2012/0011066 A1 | 1/2012 | Telle et al. |
| 2012/0014507 A1 | 1/2012 | Wu et al. |
| 2012/0072384 A1 | 3/2012 | Schreiner et al. |
| 2012/0102332 A1 | 4/2012 | Mullin |
| 2012/0124651 A1 | 5/2012 | Ganesan et al. |
| 2012/0130863 A1 | 5/2012 | Tedjamulia et al. |
| 2012/0284786 A1 | 11/2012 | Somani et al. |
| 2012/0331567 A1 | 12/2012 | Shelton |
| 2013/0004033 A1 | 1/2013 | Trugenberger |
| 2013/0086641 A1 | 4/2013 | Mehr et al. |
| 2013/0104202 A1 | 4/2013 | Yin et al. |
| 2013/0124644 A1 | 5/2013 | Hunt et al. |
| 2013/0191898 A1 | 7/2013 | Kraft |
| 2013/0219479 A1 | 8/2013 | DeSoto et al. |
| 2013/0259228 A1 | 10/2013 | Ren et al. |
| 2013/0262873 A1 | 10/2013 | Read et al. |
| 2014/0013422 A1 | 1/2014 | Janus et al. |
| 2014/0020073 A1 | 1/2014 | Ronda et al. |
| 2014/0037074 A1 | 2/2014 | Bravo et al. |
| 2014/0037156 A1 | 2/2014 | Cavallini |
| 2014/0059660 A1 | 2/2014 | Marra et al. |
| 2014/0071131 A1 | 3/2014 | Kitago |
| 2014/0075513 A1 | 3/2014 | Trammel et al. |
| 2014/0090039 A1 | 3/2014 | Bhow |
| 2014/0101434 A1 | 4/2014 | Senthurpandi et al. |
| 2014/0129493 A1 | 5/2014 | Leopold |
| 2014/0164218 A1 | 6/2014 | Stewart |
| 2014/0230023 A1 | 8/2014 | Parks |
| 2014/0247985 A1 | 9/2014 | Park |
| 2014/0253707 A1 | 9/2014 | Gangadhar |
| 2014/0258305 A1 | 9/2014 | Kapadia et al. |
| 2014/0270404 A1 | 9/2014 | Hanna et al. |
| 2014/0273978 A1 | 9/2014 | Van Snellenberg |
| 2014/0279556 A1 | 9/2014 | Priebatsch et al. |
| 2014/0289833 A1 | 9/2014 | Briceno et al. |
| 2014/0330732 A1 | 11/2014 | Grignon |
| 2014/0333415 A1 | 11/2014 | Kursun |
| 2014/0337948 A1 | 11/2014 | Hoyos |
| 2015/0046327 A1 | 2/2015 | Taupitz |
| 2015/0059003 A1 | 2/2015 | Bouse |
| 2015/0078630 A1 | 3/2015 | Derakhshani et al. |
| 2015/0121456 A1 | 4/2015 | Milman et al. |
| 2015/0154436 A1 | 6/2015 | Shi et al. |
| 2015/0156031 A1 | 6/2015 | Fadell et al. |
| 2015/0180857 A1 | 6/2015 | Schulman et al. |
| 2015/0186721 A1 | 7/2015 | Derakhshani et al. |
| 2015/0205800 A1 | 7/2015 | Work et al. |
| 2015/0227890 A1 | 8/2015 | Bednarek et al. |
| 2015/0261999 A1 | 9/2015 | Thiebot et al. |
| 2015/0269394 A1 | 9/2015 | Bringer et al. |
| 2015/0332169 A1 | 11/2015 | Bivens et al. |
| 2016/0019614 A1 | 1/2016 | Dziuk |
| 2016/0034708 A1 | 2/2016 | Shim et al. |
| 2016/0037156 A1 | 2/2016 | Lee |
| 2016/0048837 A1 | 2/2016 | Jin et al. |
| 2016/0050199 A1 | 2/2016 | Ganesan |
| 2016/0070704 A1 | 3/2016 | Yu |
| 2016/0085958 A1 | 3/2016 | Kang |
| 2016/0088023 A1 | 3/2016 | Handa et al. |
| 2016/0132901 A1 | 5/2016 | Davar et al. |
| 2016/0173605 A1 | 6/2016 | Tasi et al. |
| 2016/0191513 A1 | 6/2016 | Tomlinson et al. |
| 2016/0224853 A1 | 8/2016 | Xiong |
| 2016/0269178 A1 | 9/2016 | Yang et al. |
| 2016/0277424 A1 | 9/2016 | Mawji et al. |
| 2016/0379182 A1 | 12/2016 | Sheng et al. |
| 2017/0006008 A1 | 1/2017 | Moran et al. |
| 2017/0019400 A1 | 1/2017 | Drolshagen et al. |
| 2017/0032485 A1 | 2/2017 | Vemury |
| 2017/0034183 A1 | 2/2017 | Enqvist et al. |
| 2017/0061138 A1 | 3/2017 | Lambert |
| 2017/0082740 A1 | 3/2017 | Kitchens et al. |
| 2017/0134366 A1 | 5/2017 | Genner et al. |
| 2017/0140204 A1 | 5/2017 | Derakhshani et al. |
| 2017/0210525 A1 | 7/2017 | Mayer et al. |

(56) References Cited

U.S. PATENT DOCUMENTS

| | | |
|---|---|---|
| 2017/0250796 A1 | 8/2017 | Samid |
| 2017/0256056 A1 | 9/2017 | Jain et al. |
| 2017/0264599 A1 | 9/2017 | O'Regan et al. |
| 2017/0279795 A1 | 9/2017 | Redberg |
| 2017/0286788 A1 | 10/2017 | Fan et al. |
| 2017/0331818 A1 | 11/2017 | Kader et al. |
| 2017/0346851 A1 | 11/2017 | Drake |
| 2017/0372055 A1 | 12/2017 | Robinson et al. |
| 2018/0005019 A1 | 1/2018 | Chattopadhyay et al. |
| 2018/0018651 A1 | 1/2018 | Nelson et al. |
| 2018/0034852 A1 | 2/2018 | Goldenberg |
| 2018/0048472 A1 | 2/2018 | Pirrwitz et al. |
| 2018/0060648 A1 | 3/2018 | Yoo et al. |
| 2018/0069703 A1 | 3/2018 | Chakraborty et al. |
| 2018/0077571 A1 | 3/2018 | Mannopantar et al. |
| 2018/0082455 A1 | 3/2018 | Yamaji et al. |
| 2018/0097806 A1 | 4/2018 | Blinn |
| 2018/0101742 A1 | 4/2018 | Burge et al. |
| 2018/0167388 A1 | 6/2018 | Farrell et al. |
| 2018/0191501 A1 | 7/2018 | Lindemann |
| 2018/0205557 A1 | 7/2018 | Sun |
| 2018/0211092 A9 | 7/2018 | Derakhshani et al. |
| 2018/0248699 A1 | 8/2018 | Andrade |
| 2018/0302406 A1 | 10/2018 | Burckhardt et al. |
| 2018/0307895 A1 | 10/2018 | Chu et al. |
| 2019/0043148 A1 | 2/2019 | Vemury |
| 2019/0044723 A1* | 2/2019 | Prakash ............... G06V 40/40 |
| 2019/0130082 A1* | 5/2019 | Alameh ............. G06F 21/6218 |
| 2019/0311102 A1 | 10/2019 | Tussy |
| 2019/0312731 A1* | 10/2019 | Eldefrawy ............. H04L 9/085 |
| 2019/0312734 A1 | 10/2019 | Wentz et al. |
| 2019/0334884 A1 | 10/2019 | Ross et al. |
| 2019/0379541 A1 | 12/2019 | Schwach et al. |
| 2020/0036707 A1* | 1/2020 | Callahan ............. H04L 67/53 |
| 2020/0084191 A1 | 3/2020 | Nicholls |
| 2020/0145219 A1 | 5/2020 | Sebastian et al. |
| 2020/0153624 A1 | 5/2020 | Wentz et al. |
| 2020/0186350 A1 | 6/2020 | Wentz et al. |
| 2020/0201679 A1 | 6/2020 | Wentz |
| 2020/0257889 A1 | 8/2020 | Merkel et al. |
| 2020/0293640 A1 | 9/2020 | Joshi et al. |
| 2020/0351089 A1 | 11/2020 | Wentz |
| 2020/0351098 A1 | 11/2020 | Wentz |
| 2020/0351657 A1 | 11/2020 | Wentz |
| 2020/0356085 A1 | 11/2020 | Wentz et al. |
| 2020/0404019 A1 | 12/2020 | Drake |
| 2021/0019519 A1 | 1/2021 | Martin et al. |
| 2021/0027080 A1 | 1/2021 | Storm et al. |
| 2021/0073518 A1 | 3/2021 | Kumar et al. |

FOREIGN PATENT DOCUMENTS

| | | |
|---|---|---|
| WO | 2008010773 A1 | 1/2008 |
| WO | 2019034589 A1 | 2/2019 |

OTHER PUBLICATIONS

Xinting Gao, Single-View Recaptured Image Detection Based on Physics-Based Features, 2010 IEEE International Conference on Multimedia and Expo, Jul. 19, 2010, pp. 1469 to 1474.

Di Wen, Face Spoof Detection with Image Distortion Analysis, IEEE Transactions on Information Forensics and Security, vol. 10, No. 4, Apr. 2015, pp. 746 to 761.

Rohit Kumar Pandey, Deep Secure Encoding for Face Template Protection, Conference on Computer Vision and Pattern Recognition Workshops, Jun. 26, 2016, pp. 77 to 83.

Rathgeb et al., "Unlinkable Improved Multi-biometric Iris Fuzzy Vault", EURASIP Journal on Information Security, 2016, 2016:26.

* cited by examiner

FIG. 1: EXEMPLARY SYSTEM DIAGRAM

FIG. 2: EXEMPLARY HASH TRANSFORM PROCESS

FIG. 3: EXEMPLARY UNIQUE KEY ENROLLMENT PROCESS

FIG. 4: EXEMPLARY VERIFICATION PROCESS

SYSTEMS AND METHODS FOR ENHANCED HASH TRANSFORMS

CROSS REFERENCE TO RELATED APPLICATIONS

This application is a continuation and claims the benefit of and priority to U.S. application Ser. No. 16/406,978, filed May 8, 2019, entitled "SYSTEMS AND METHODS FOR ENHANCED HASH TRANSFORMS," which claims the benefit of, and priority to, the below listed U.S. Provisional Patent Applications: App. No. 62/668,610, filed on May 8, 2018, and entitled "MACHINE READABLE CODE ACCOUNT ACCESS;" App. No. 62/668,576, filed on May 8, 2018, and entitled "THE EVERGREEN HASH;" and App. No. 62/829,825, filed on Apr. 5, 2019, and entitled "EVERGREEN HASH," the disclosures of which are incorporated by reference as if the same were set forth herein in their entireties.

TECHNICAL FIELD

The present technology relates generally to encryption, and more specifically to multi-factor encryption methods via combining hashing techniques with biometric data.

BACKGROUND

Conventional cryptographic hashing techniques generally include functions that generate unique signatures given a piece of data. Typically, these conventional techniques accept a binary string of characters as an input, and produce a string (e.g., a digital signature) as an output. Generally, each authentication technique creates its own "identity" which is then correlated back to various types of personal identification information (e.g., name, date of birth, social security number, other knowledge-based authentication data) commonly exploited in identity thefts of the like, thus introducing a security risk. Furthermore, authentication vendors need to be approved, each new technique needs systems integrations, and each new "identity" needs to be mapped to and integrated into the enterprise data flows causing expensive and lengthy implantation challenges. Accordingly, there exists a long-felt but unresolved need for improved techniques for securely handling sensitive data.

BRIEF SUMMARY OF DISCLOSURE

Aspects of the present disclosure relate generally to systems and methods for performing hash transforms over biometric data. According to one aspect of the present disclosure, a biometric sample including a collection of data points or a fixed-size vector relating to a person's face may be transformed, via one or more hash transform functions, into a biometric template where the transform is irreversible (in some embodiments). For example, in particular embodiments, even if a potential attacker possessed the transformed biometric template, the original template/sample cannot be reconstructed with 100% fidelity (e.g., the transform is "lossy").

In one embodiment, the biometric template may be generated, or encoded, from an image of a person's face. According to various aspects of the present disclosure, characteristics of the persons face may be identified via techniques such as convolutional neural networks, and those characteristics may be encoded and included in the fixed-size vector (or similar data object). In a particular embodiment, the bio-hash and a key, or hashing key, may be concatenated in a fixed-size vector, and further transformed via a seed-generated hashing algorithm. According to various aspects of the present disclosure the fixed-size vector may be smaller in size than the bio-hash (128 bytes) and the key (8 bytes) combined (136 bytes), and thus, the hash transform is lossy (only 128 bytes). However, in some embodiments, the present systems and methods may execute lossless hash transforms.

In certain embodiments, a seed is chosen or randomly generated for the transform process. In particular embodiments, the seed is a parameter in the transform process for determining shifting and scaling of the biometric sample and key to execute the transform process. The seed may be a random number or value used to (initialize a random number generator that can) generate transformation parameters or non-biodata. In various embodiments, the seed may be derived from a password, PIN, or key. In particular embodiments, the seed can be encrypted, and its encrypted form may be stored as a QR code or digital token. In one embodiment, the hash transform process may leverage pseudonymization operations (as recommended by GDPR) for executing the hash transform process. In particular embodiments, the hash transform process may also leverage anonymization operations. In response to executing the hash transform, and according to various aspects of the present disclosure, the output from the hash transform is a "cancellable" template, where the template is cancellable such that a new template can be generated with a new seed, but the two templates may be similar enough to allow for either template to be used in a reverse transform process for reconstructing the original bio-metric template/bio-hash, or at least reconstructing the original biometric template/bio-hash enough to securely verify the user with the key.

In various embodiments, in addition to primary authentication data and a "header" with optional and limited unencrypted data, the hashes discussed herein can store any secondary authentication data (and KYC/AML and other data) and can embed "pivot points" to external data. While the storage architecture for the primary authentication fields may be fixed to ensure compatibility and search-ability within and (potentially) across institutions, additional fields may be unique to each institution with specific permissions attributed.

According to various aspects of the present disclosure, the hashes discussed in the present disclosure represent a "digital-DNA" that may include a global and lifelong authentication for an individual, regardless of the evolution or proliferation of authentication techniques. In particular embodiments, not just the additional data stored, but also the methodology used for the primary authentication can be changed over time while preserving the record architecture guarding against system and data redundancy. Aspects of the present disclosure allow for integrating new techniques in a seamless, fast, and inexpensive manner.

The hashing techniques discussed herein may be server and/or blockchain-based, and may allow for enterprises to implement multiple and evolving authentication techniques into a standard record that can serve users based on the market, risk level, and circumstances. For example, various identification cards/resources such as drivers licenses, state ID cards, federal ID's, etc., may be accepted by various institutions based on predetermined standards at those institutions, and these forms of identification can be used for generating or verifying bio-hashes.

An institution using the secure code discussed herein may decide to only accept hashes generated by its own systems, or it may enter into mutual recognition agreements and/or data sharing with other institutions with acceptable standards, whether for fraud detection, customer mobility or interoperability.

In particular embodiments, the systems and methods discussed herein are supported by at least a hash controller and processor. In one embodiment, the hash controller may be software, hardware, or a HW/SW combination, where the hash controller may control or own hashes, generate transform parameters given a seed, transform the hashes, reverse transform hashes, and allow for operations such as enrollment, database deduplication, identification, and verification. In certain embodiments, the hash processor may also be software, hardware, or a HW/SW combination, and the processor may process hashes, transform bio-hashes into transformed hashes but may not reverse transform, and may perform the operations including database deduplication, identification, and verification.

According to various aspects of the present disclosure, a method is discussed for transforming biometric data, comprising the steps of: receiving biometric data corresponding to a user at an electronic computing device, wherein the biometric data is represented as a first vector of floating point values; receiving non-biometric data comprising a second vector of floating point values; concatenating the biometric data with the non-biometric data into a third vector of floating point values; permuting the third vector, wherein permuting the third vector comprises swapping locations of data elements within the third vector according to a seed associated with the non-biometric data; projecting the permuted third vector, wherein projecting the permuted third vector comprises scaling the vector elements according to the seed; and permuting the projected vector, wherein permuting the projected vector generates a biometric template corresponding to the received biometric data.

In one embodiment, the method further comprises the steps of: generating a unique key associated with the received biometric data; and storing the unique key in a database, wherein the unique key is stored in association with the generated biometric template. In various embodiments, the unique key is transmitted to the user for identity verification. In particular embodiments, the unique key is a QR code.

In at least one embodiment, the size of the third vector of floating point values is less than a combined size of the first vector of floating point values and the second vector of floating point values. In certain embodiments, the size of the first vector of floating point values is 128 bytes, the size of the second vector of floating point values is 8 bytes, and the size of the third vector of floating point values is 128 bytes. In one embodiment, the size of the third vector of floating point values is reduced to generate a lossy biometric template.

According to various aspects of the present disclosure, the seed is generated via a random number generator. In certain embodiments, the database/hash registry comprises a data lake. In a particular embodiment, the biometric data comprises encoded image data captured via the electronic computing device.

In various embodiments, the present disclosure discusses a system for transforming biometric data, comprising: an electronic computing device comprising an image capturing device; a hash controller; and a hash processor, wherein the hash processor is operable to: receive biometric data corresponding to a user from the electronic computing device, wherein the biometric data is represented as a first vector of floating point values; receive non-biometric data comprising a second vector of floating point values; concatenate the biometric data with the non-biometric data into a third vector of floating point values; permute the third vector, wherein permuting the third vector comprises swapping locations of data elements within the third vector according to a seed associated with the non-biometric data; project the permuted third vector, wherein projecting the permuted third vector comprises scaling the vector elements according to the seed; and permute the projected vector, wherein permuting the projected vector generates a biometric template corresponding to the received biometric data.

In one embodiment, the hash processor is further operable to: generate a unique key associated with the received biometric data; and store the unique key in a database, wherein the unique key is stored in association with the generated biometric template. In certain embodiments, the unique key is transmitted to the user for identity verification. In a particular embodiment, the unique key is a QR code.

In various embodiments, the size of the third vector of floating point values is less than a combined size of the first vector of floating point values and the second vector of floating point values. According to various aspects of the present disclosure, the size of the first vector of floating point values is 128 bytes, the size of the second vector of floating point values is 8 bytes, and the size of the third vector of floating point values is 128 bytes. In certain embodiments, the size of the third vector of floating point values is reduced to generate a lossy biometric template.

In various embodiments, the seed is generated via a random number generator. In particular embodiments, the database/hash registry comprises a data lake. In at least one embodiment, the biometric data comprises encoded image data captured via the electronic computing device.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF DRAWINGS

The accompanying drawings illustrate one or more embodiments, and/or aspects of the disclosure and, together with the written description, serve to explain the principles of the disclosure. Whenever possible, the same reference numbers are used throughout the drawings to refer to the same or like elements of an embodiment, and wherein.

DETAILED DESCRIPTION OF DRAWINGS

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure relate generally to systems and methods for performing hash transforms over biometric data. According to one aspect of the present disclosure, a biometric sample including a collection of data points or a fixed-size vector relating to a person's face may be transformed, via one or more hash transform functions, into a biometric template where the transform is irreversible (in some embodiments). For example, in particular embodiments, even if a potential attacker possessed the transformed biometric template, the original template/sample cannot be reconstructed with 100% fidelity (e.g., the transform is "lossy").

In one embodiment, the biometric template may be generated, or encoded, from an image of a person's face. According to various aspects of the present disclosure, characteristics of the persons face may be identified via techniques such as convolutional neural networks, and those characteristics may be encoded and included in the fixed-size vector (or similar data object). In a particular embodiment, the bio-hash and a key, or hashing key, may be concatenated in a fixed-size vector, and further transformed via a seed-generated hashing algorithm. According to various aspects of the present disclosure the fixed-size vector may be smaller in size than the bio-hash (128 bytes) and the key (8 bytes) combined (136 bytes), and thus, the hash transform is lossy (only 128 bytes). However, in some embodiments, the present systems and methods may execute lossless hash transforms.

In certain embodiments, a seed is chosen or randomly generated for the transform process. In particular embodiments, the seed is a parameter in the transform process for determining shifting and scaling of the biometric sample and key to execute the transform process. The seed may be a random number or value used to (initialize a random number generator that can) generate transformation parameters or non-biodata. In various embodiments, the seed may be derived from a password, PIN, or key. In particular embodiments, the seed can be encrypted, and its encrypted form may be stored as a QR code or digital token. In one embodiment, the hash transform process may leverage pseudonymization operations (as recommended by GDPR) for executing the hash transform process. In particular embodiments, the hash transform process may also leverage anonymization operations. In response to executing the hash transform, and according to various aspects of the present disclosure, the output from the hash transform is a "cancellable" template, where the template is cancellable such that a new template can be generated with a new seed, but the two templates may be similar enough to allow for either template to be used in a reverse transform process for reconstructing the original bio-metric template/bio-hash, or at least reconstructing the original biometric template/bio-hash enough to securely verify the user with the key.

In various embodiments, in addition to primary authentication data and a "header" with optional and limited unencrypted data, the hashes discussed herein can store any secondary authentication data (and KYC/AML and other data) and can embed "pivot points" to external data. While the storage architecture for the primary authentication fields may be fixed to ensure compatibility and search-ability within and (potentially) across institutions, additional fields may be unique to each institution with specific permissions attributed.

According to various aspects of the present disclosure, the hashes discussed in the present disclosure represent a "digital-DNA" that may include a global and lifelong authentication for an individual, regardless of the evolution or proliferation of authentication techniques. In particular embodiments, not just the additional data stored, but also the methodology used for the primary authentication can be changed over time while preserving the record architecture guarding against system and data redundancy. Aspects of the present disclosure allow for integrating new techniques in a seamless, fast, and inexpensive manner.

The hashing techniques discussed herein may be server and/or blockchain-based, and may allow for enterprises to implement multiple and evolving authentication techniques into a standard record that can serve users based on the market, risk level, and circumstances. For example, various identification cards/resources such as drivers licenses, state ID cards, federal ID's, etc., may be accepted by various institutions based on predetermined standards at those institutions, and these forms of identification can be used for generating or verifying bio-hashes.

An institution using the secure code discussed herein may decide to only accept hashes generated by its own systems, or it may enter into mutual recognition agreements and/or data sharing with other institutions with acceptable standards, whether for fraud detection, customer mobility or interoperability.

In particular embodiments, the systems and methods discussed herein are supported by at least a hash controller and processor. In one embodiment, the hash controller may be software, hardware, or a HW/SW combination, where the hash controller may control or own hashes, generate transform parameters given a seed, transform the hashes, reverse transform hashes, and allow for operations such as enrollment, database deduplication, identification, and verification. In certain embodiments, the hash processor may also be software, hardware, or a HW/SW combination, and the processor may process hashes, transform bio-hashes into transformed hashes but may not reverse transform, and may perform the operations including database deduplication, identification, and verification.

EXEMPLARY EMBODIMENTS

Figure 1:
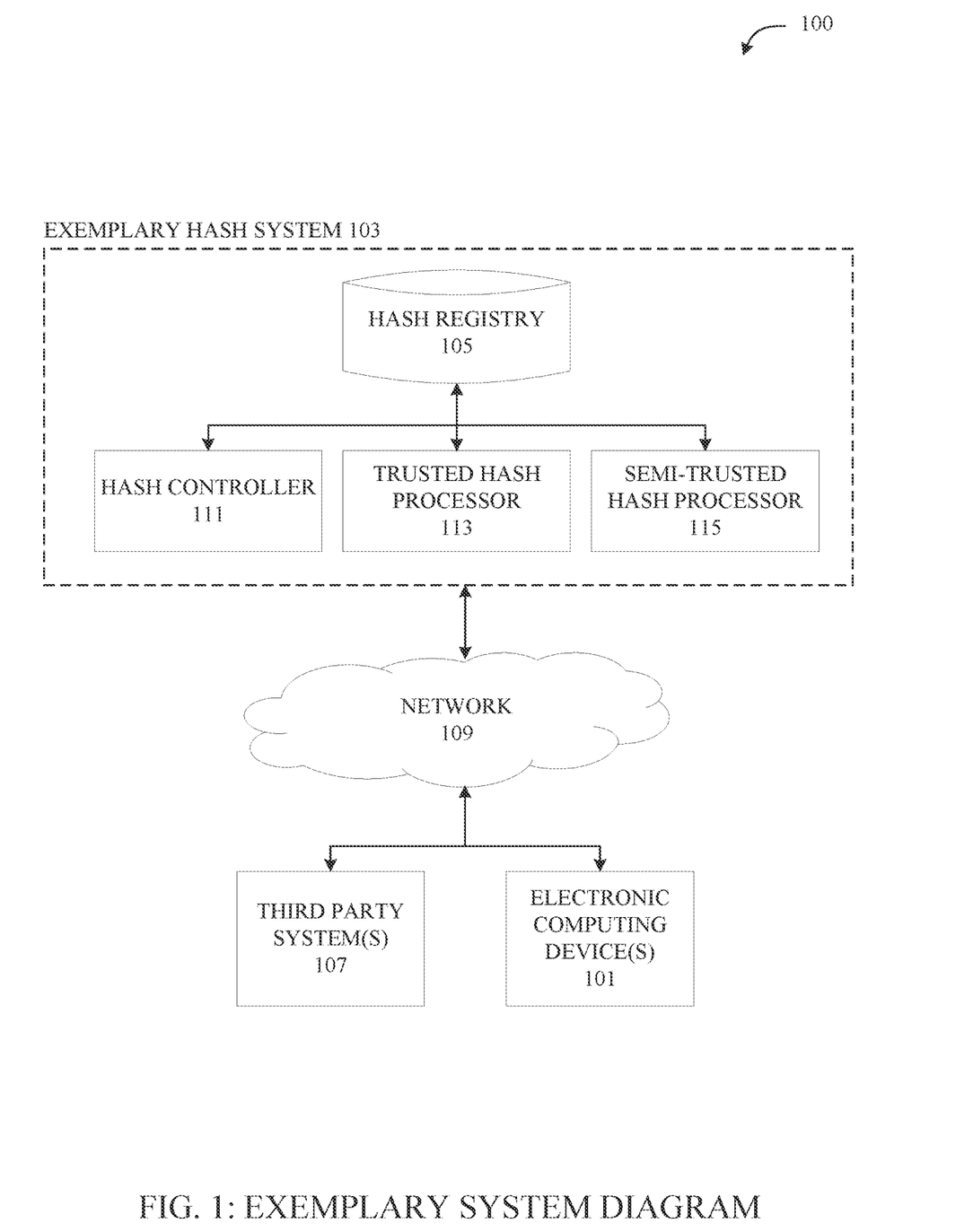
FIG. 1 is an exemplary system diagram, according to one aspect of the present disclosure.

Referring now to the figures, for the purposes of example and explanation of the fundamental processes and components of the disclosed systems and methods, reference is made to FIG. 1, which illustrates an exemplary system architecture 100 of one embodiment of the present disclosure. As will be understood and appreciated, the exemplary architecture 100 shown in FIG. 1 represents merely one approach or embodiment of the present system, and other aspects are used according to various embodiments of the present system. Generally, the disclosed system architecture 100 facilitates improved hashing techniques for identity verification, security, etc., via biometric data. Biometric data may, in various embodiments, be derived from facial features, fingerprints, voice recognition, DNA, or any other individual-specific/unique biometric data. According to various aspects of the present disclosure, biometric data (also referred to herein as a biometric sample, face template, and bio-hash) may include a collection of bio-data corresponding to a person, where the bio-data preferably includes image data encoded (via deep convolution neural networks, or the like) into a hash or similar data structure (e.g., a vector). Pre-verified identity data may, in various embodiments, be derived from government-issued identification documents, employer-issued identification documents, social media accounts, etc. In a particular embodiment, the system may generate hashes based on the biometric/identity data, and the hashes may further be transformed for increased security (as will be discussed in further detail below), and compliance with data regulations.

In one embodiment, the disclosed system architecture 100 includes an electronic computing device 101 operatively connected to an exemplary hash system 103, and one or more third party systems 107, via a network 109, for generating and managing the hashes. According to various aspects of the present disclosure, the exemplary hash system 103 includes a hash registry 105, a hash controller 111, a trusted hash processor 113, and a semi-trusted hash processor 115, where each of these system components may electronically communicate with each other, and each component performs a particular role. In at least one embodiment, the exemplary hash system 103 may include a plurality of hash registries 105 for different purposes; however, each hash registry is operable to store hashes, transformed hashes, biometric hashes, biometric hash templates, etc. In particular embodiments, hash registries 105 may be assigned to, belong to, or operatively communicate with the hash controllers 111, trusted hash processors 113, and semi-trusted hash processors 115, for maintaining a record of the generated hash transforms and identification keys. In at least one embodiment, the electronic computing device 101 may include an on-device hash registry 105, hash controller 111, trusted hash processor 113, and/or semi-trusted hash processor 115, for performing the system operations discussed herein.

Generally, the electronic computing device 101 is any device that is capable of performing the functionality disclosed herein (e.g., desktop computer, laptop computer, tablet computer, smartphone, smartwatch, camera, video camera, image capture device, etc.). In various embodiments, the electronic computing device 101 communicates via network 109 with the hash system 103 and the third party system(s) 107 as part of the system process 200. In one embodiment, the electronic computing device 101 is the device through which a user may access a protected account, or request requested access to an asset or system, which may initiate an identity authentication process requiring biometric data (e.g., an image of the user). In one embodiment, the electronic computing device 101 has a camera or other image capture device and may take images in real time for capturing biometric data for identity authentication.

Generally, the exemplary hash system 103 may be any computing device (e.g., desktop computer, laptop, servers, tablets, etc.), combination of computing devices, software, hardware, or combination of software and hardware that is capable of performing the functionality disclosed herein. In various embodiments, the exemplary hash system 103 is operatively connected to the electronic computing device 101 and third party systems 107 via the network 109 to conduct the processes/analyses disclosed herein. In one embodiment, the exemplary hash system 103 further includes one or more hash registries 105, which includes a set of biohashes representative of a collection or "gallery" of user identities. Generally, a hash registry 105 may be any computing device (e.g., desktop computer, laptop, servers, tablets, etc.), combination of computing devices, software, hardware, combination of software and hardware, database (e.g., stored in the cloud or on premise, structured as relational, etc.), or combination of databases that is capable of performing the functionality disclosed herein. In a particular embodiment, the hash registry 105 may include cache memory, virtual memory, RAM, etc. In one embodiment, the hash registry 105 may be local to the exemplary hash system 103 (e.g., the exemplary hash system 103 includes the hash registry 105, etc.), and furthermore, one or more hash registries 105 may correspond to particular hash controllers 111, trusted hash processors 113, and semi-trusted hash processors 115, to support processes at those system components. In other embodiments, the hash registry 105 is virtual or stored in the "cloud." In one embodiment, the hash registry 105 includes data for identity authentication (e.g., names associated with accounts, photographs of individuals associated with accounts, etc.).

Generally, the third party system 107 may be any computing device (e.g., desktop computer, laptop, servers, tablets, etc.), combination of computing devices, software, hardware, or combination of software and hardware that is capable of performing the functionality disclosed herein. In various embodiments, the third party system 107 communicates via network 109 with the electronic computing device 101 and the exemplary hash system 103 as part of the system process 200. In one embodiment, the third party system 107 may be the system that the user is attempting to access via the electronic computing device 101. In one embodiment, the third party system 107 provides additional data to further confirm the identity of the user of the electronic computing device 101.

In various embodiments, the hash controller 111 may determine how hashes are processed, transformed, or generally used within the system, and the trusted hash processor 113 and semi-trusted hash processor 115 may execute the processing of the hashed according to instructions (or general direction) from the hash controller 111. According to various aspects of the present disclosure, the hash controller 111 "owns" the hashes in the hash system 103, where owning the hashes may include storing a record of lossless hashes so that the original biometric data may be recovered via reverse hashing, if needed. In at least one embodiment, the hash controller 111 generates transformation parameters for executing hash transforms, the hash controller 111 may further execute reverse transforms on hashes, and the hash controller may execute various operations such an enrollment (e.g., associating a new user with the hash system 103), database deduplication, identification, and verification.

In one embodiment, the trusted hash processor 113 may process hashes. For example, the trusted hash processor may receive transformed hashes and transformation parameters, but not the seed used to generate the parameters. Accordingly, the trusted hash processor 113 may not reverse transform hashes (according to some, but not all, embodiments), but the trusted hash processor 113 may perform database deduplication, identification, and verification. In a particular embodiment, the trusted hash processor 113 may not store prior copies of the hash registry 105.

In particular embodiments, the semi-trusted hash processor 115 may be operable to transform a live bio-hash into a transformed hash, but the semi-trusted hash processor 115 may not perform reverse transforms. According to various aspects of the present disclosure, hash registries 105 stored at the semi-trusted hash processor 115 include "shelf-lives" that are shorter than those at a trusted hash processor 113, and thus need to be updated more frequently. In certain embodiments, the semi-trusted hash processor 115 may perform database deduplication, identification, and verification.

Generally, the network 109 may be any connection capable of transferring data between two or more computer systems (e.g., a secure or unsecured connection, Bluetooth, wireless or wired local-area networks (LANs), cell network, the Internet, etc.).

Figure 2:
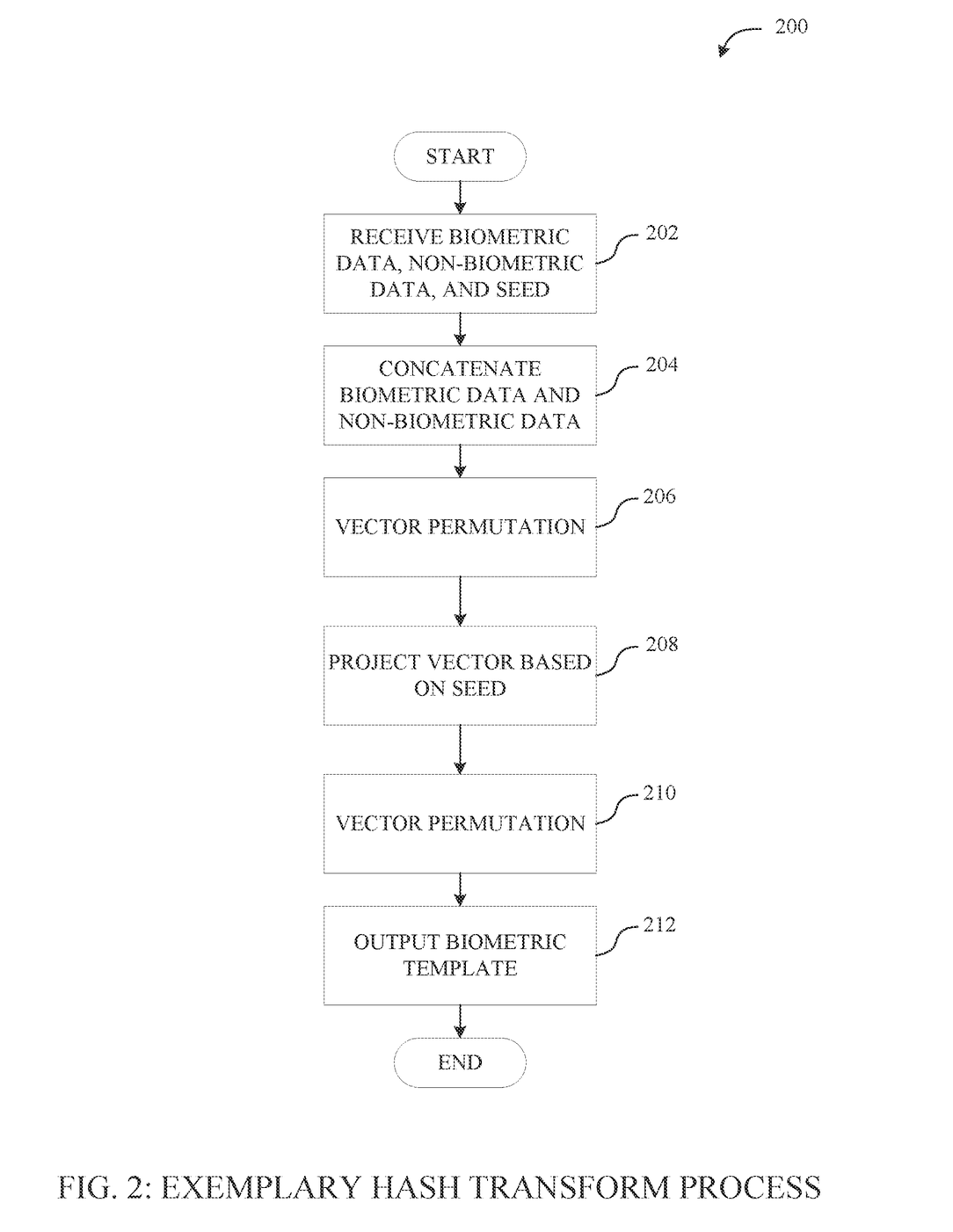
FIG. 2 is a flowchart of an exemplary hash transform process, according to one aspect of the present disclosure.

Turning now to FIG. 2, an exemplary hash transform process 200 is shown, according to one aspect of the present disclosure. As will be understood by one having ordinary skill in the art, the steps and processes shown in FIG. 2 (and those of all other flowcharts described herein) may operate concurrently and continuously, are generally asynchronous and independent, and are not necessarily performed in the order shown. In various embodiments, the exemplary hash transform process 200 may be initiated in response to a variety of system triggers. For example, a user at an electronic computing device 101 attempting to access protected data (such as an email, an application, a third party system 107, etc.) may prompt the system to request biometric data from the user (e.g., a picture), and the system may furthermore execute the hash process 200 with the received biometric data.

In various embodiments, the hash transform process 200 may begin at step 202, where the exemplary hash system 103 receives data such as biometric data, non-biometric data, and a seed. According to various aspects of the present disclosure, the biometric data may include a vector of floating point numbers that correspond to the biometric data. In a preferred embodiment, the vector of floating point numbers may correspond to a user's facial profile, and the vector may be generated according to the techniques discussed in the U.S. patent application Ser. No. 15/782,940, entitled "SYSTEMS AND METHODS FOR PASSIVE-SUBJECT LIVENESS VERIFICATION IN DIGITAL MEDIA," filed on Oct. 13, 2017, the entire disclosure of which is herein incorporated by reference. In some embodiments, the system may verify the liveness of the received biometric data, thus ensuring that the biometric data is valid and not spoofed. In one embodiment, the non-biometric data may include transform parameters determined based on the seed. In particular embodiments, the non-biometric data may include a key, such as a public or private key, provided by the user for verifying his/her identity.

According to at least one aspect of the present disclosure, at step 204, the system concatenates the biometric data and non-biometric data into a single vector (or similar data object). In a particular embodiment, concatenating the biometric data and non-biometric data includes combining the data from both data samples into a single vector for subsequent vector transformations (steps 206-210). In certain embodiments, the vector including the concatenated data, at step 204, may be smaller in size than the total number of bytes from the original biometric data and non-biometric data samples. In these certain embodiments, the hash transform process 200 is considered "lossy," as some data is intentionally excluded from the transform. In embodiments where no data is lost or excluded during concatenation, the hash transform is considered to be "lossless." In particular embodiments, the system may perform a lossless hash transform when generating a hash to be securely stored in a hard to breach location, and in other scenarios the system may perform lossy transforms.

In one embodiment, and at step 206, the system performs a vector permutation on the concatenated vector from step 204. According to various aspects of the present disclosure, performing a vector permutation on the concatenated vector includes swapping data elements in the vector (via a permutation matrix or the like), such that the vector data is still included in the vector, but is represented in a new and rearranged format. In some examples, this process may be akin to shuffling a deck of cards, where the seed provides an indication of the shuffling pattern.

Proceeding now to step 208, the permuted vector from step 206 may be linearly projected based on a random number generated via the seed (or another method via the non-biometric data). According to various aspects of the present disclosure, projecting the permuted vector replaces the vector elements with new elements based on the projection.

At step 210, according to particular embodiments, the linearly projected vector is permuted for a second time. Similar to the step 206, at step 210 the system further complicates the original vector of biometric and non-biometric data. According to various aspects of the present disclosure, in response to the second permutation at step 210, the system returns/outputs a transformed hash, or "biometric template," at step 212. According to various aspects of the present disclosure, and depending on the system trigger that initiated the process 200, the system may store the transformed hash in association with a user account at the hash registry 105, the transformed hash may be compared to one or more stored hashes for verifying a user's identity prior to accessing protected data, etc.

Figure 3:
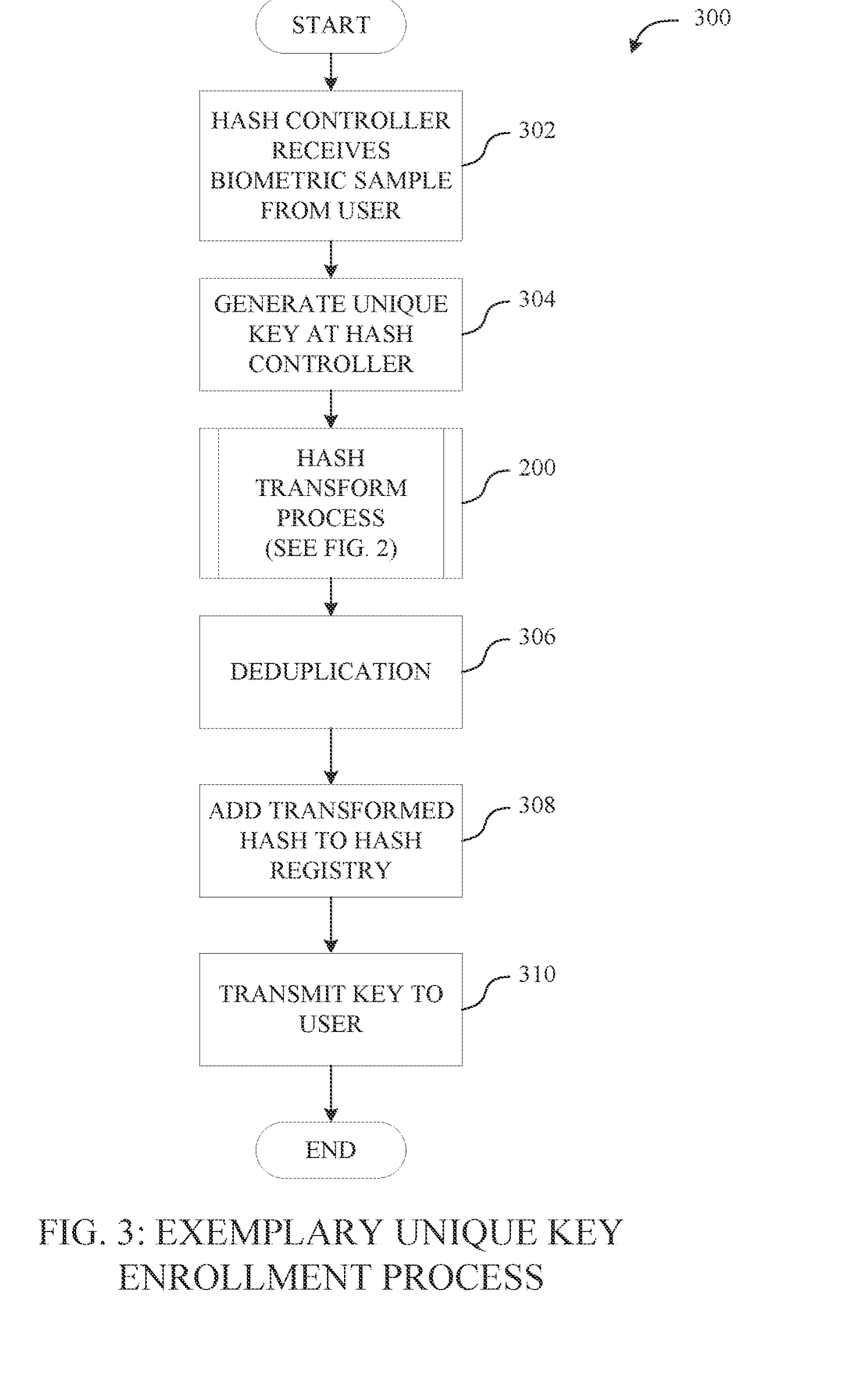
FIG. 3 is a flowchart of an exemplary key enrollment process, according to one aspect of the present disclosure.

Turning now to FIG. 3, a flowchart illustrating an exemplary unique key enrollment process 300 is shown, according to one aspect of the present disclosure. In various embodiments, unique keys (e.g. private keys) may be assigned to users of the system, and the unique keys may correspond to each users own biometric data. In one embodiment, the process 300 begins at step 302 where the hash controller 111 receives a biometric sample from a user. In one embodiment, the biometric sample may be a picture, or a hashed/encoded representation of a picture, taken via the electronic computing device 101. In some embodiments, the biometric sample may include picture data from social media platforms, or the like (e.g., third party systems 107).

At step 304, the system generates a unique key at the hash controller 111, where the unique key is representative of the user and the corresponding received biometric sample (or a previously generated biometric template). In particular embodiments, the unique key may be derived from Euclidean measurements of distances between biometric characteristics and/or from the locational relationship of multiple biometric minutia (identified in the biometric data). In various embodiments, the data (e.g., biometric data) used to generate the unique key may be subjected to an irreversible transformation to generate a fixed vector hash.

At step 306, the system may perform the hash transform process 200, as discussed above in the description associated with FIG. 2, where the biometric sample from step 302 and the generated unique key from step 304 are input parameters for the process 200. In various embodiments, the output from the hash transform process 200 may be a biometric template (e.g., from the step 212), and the system may perform deduplication on the system database (e.g., the hash registry 105) at step 306. As will be understood by one of ordinary skill in the art, deduplication is a process in computing for eliminating duplicates or redundant information in databases, or the like. Accordingly, and in response to generating the biometric template, the system may scan the hash registry 105 for an already-stored biometric template that matches the generated biometric template within a certain confidence threshold (e.g., a 90% match, a 95% match, etc.). In some embodiments, if during the deduplication step 306 the system determines that a stored biometric template already exists, the pre-existing biometric template may be replaced with the newly generated biometric template from the process 200.

In response to performing deduplication at step 306 (and assuming that a substantially similar biometric template was not already included in the hash registry 105) the system may add the biometric template/transformed hash to the hash registry at step 308. In at least one embodiment, the biometric template is stored in the hash registry 105 in association with the generated unique key from step 304. According to various aspects of the present disclosure, at step 310, the key is transmitted to the user and the process 300 may terminate thereafter. In further scenarios, the user may provide this key and a new biometric data sample when requesting access to protected data (e.g., if the user's identity is to be verified for accessing a system, asset, etc.), and the system may perform the hash transform process on the key and newly provided biometric sample. According to various aspects of the present disclosure, the output from the hash transform process, given the key and newly provided biometric sample as parameters, should match (or substantially match) with the biometric template and key stored in the hash registry 105 at step 308.

Figure 4:
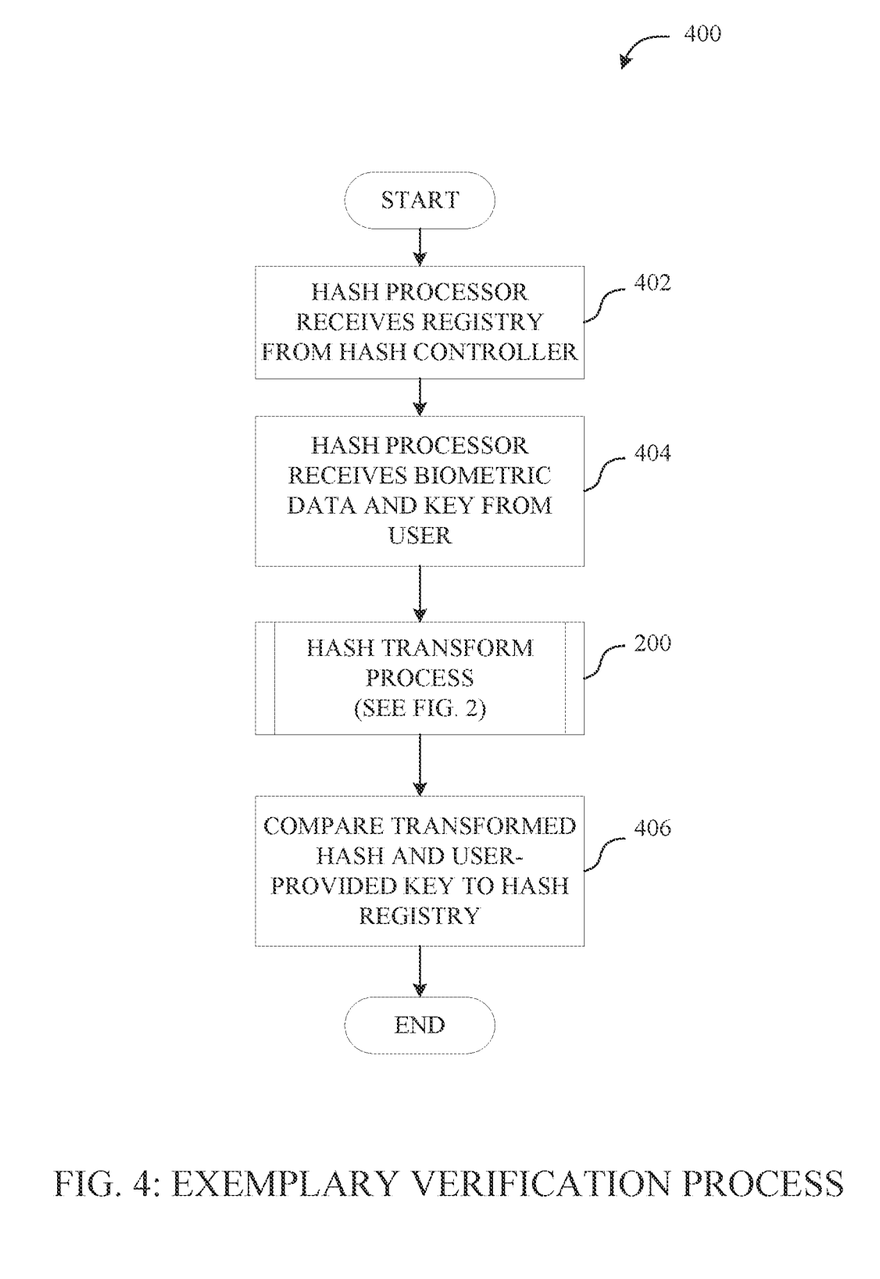
FIG. 4 is a flowchart of an exemplary key verification process, according to one aspect of the present disclosure.

Referring now to FIG. 4, a flowchart illustrating a verification via unique key process 400 is shown, according to one aspect of the present disclosure. According to various aspects of the present disclosure, the process 400 is generally executed in response to a user at the electronic computing device 101, who is already enrolled with the system and possess a unique key, attempting to access protected data (or a similar activity). In various embodiments, the process 400 may begin at step 402, where the hash processor (e.g., the trusted hash processor 113 or the semi-trusted hash processor 115) receives the hash registry 105, or an instance or portion of the hash registry 105, from the hash controller 111. In certain embodiments, the hash controller 111 may periodically distribute a most-recent hash registry 105 to one or more devices in the system including a hash processor (113 and/or 115), thus providing the hash processors access to the registry for verifying processed and transformed biometric data to hashes/biometric templates stored in the hash registry 105.

In one embodiment, at step 404, the hash processor may receive biometric data (e.g., a biohash) and a key from the user. According to various aspects of the present disclosure, the biohash may include hashed biometric data (such as a picture taken via the electronic computing device 101), and the key may include the unique key generate from the user according to the process 300 (at step 304).

In a particular embodiment, the process 400 may proceed to perform the hash transform process 200, where the biometric data and key received at the hash processor are the input parameters for the process 200.

In certain embodiments, and at step 406, the transformed hash returned from the process 200 may be compared, along with the user provided key, to one or more stored biometric templates at the hash registry 105. In at least one embodiment, if both the transformed hash and user provided key match (or substantially match to a certain degree/threshold) with the data included within the hash registry, the user identity may be verified.

Exemplary Aspects

Summary

In various embodiments, the hash transform process discussed herein may accept biometric data (such as a face template) as an input, and then applies an irreversible transform. Therefore, if an attacker were to illegitimately obtain the transformed biometric template, the attacker would not be able to recover or reconstruct the original template with 100% fidelity (the transform is lossy).

In certain embodiments, this hash transform process uses pseudonymisation operations that are recommended by GDPR. In various embodiments, the hash transform implements vector permutations and projections for shifting and scaling a face template (e.g., a fixed-size vector of floating point values) according to a seed from a random number generator (or the like). According to various aspects of the present disclosure, implementing a seed provides added security, and the seed (or data/keys generated based on the seed) may be required for approximately recovering the transformed template (hence forming the second element of two-factor authentication).

In particular embodiments, the hash transform is analogous to symmetric homomorphic encryption. In certain embodiments, the system stores the biometric data as transformed biometric templates; however, the biometric data is typically not stored in its original, non-transformed, form. According to various aspects of the present disclosure, a unique key (token) used to transform the template may be used to approximately reconstruct the template. In one embodiment, the transformed biometric template may still be processed to support identity verification (1:1 matching) and identification (1:M matching), without suffering from significant degradation in accuracy (e.g., homomorphic).

In one embodiment, the hash transform may combine or concatenate a biometric data sample with a piece of non-biodata, using a transformation with parameters derived from a seed. In various embodiments, a biohash may include 128 dimensions (for exemplary purposes only, actual implementation may differ) and the key, or non-biometric data, may include 8 dimensions (i.e., 8 randomly generated numbers with zero mean and unit variance). In a particular embodiment, the concatenated vector of 136 elements is then permuted (order being swapped) according to a random permutation, where the parameters for the random permutation are also generated from the same seed in this example. In various embodiments, the output vector may be linearly projected to a new vector of 128 elements, the order of which is then permuted to obtain the transformed hash.

Exemplary Role-Based Transform

In various embodiments, the hash transform discussed herein may be applied multiple times to a biometric data sample for increased security. In certain embodiments, different parties may also be involved in the transform. For example, a first organization (e.g., a user, an application, a system, etc.) may transform a biometric data sample based on a particular seed, a second organization may further transform the transformed biometric sample from the first organization, and so on. According to various embodiments, this allows for the biometric data sample to be secured according to a particular organization's standards.

In a particular embodiment, when multiple parties have transformed a biometric sample or biometric template, recovery/reversal of the original hash may be executed in the reversed order. In these embodiments, forward transform is similar to encryption, and reverse transform is similar to decryption. However, in various embodiments, without the seed, computing the parameters needed for reverse transform by brute-force is computationally expensive.

Cross-Site Biometric Attack not Permitted

According to various aspects of the present disclosure, the transformed hash may be useful for intended and designated applications. For example, in one embodiment, an attacker who illegitimately obtains a transformed hash for one application and inserts it into another application may find that the inserted hash fails to match the victim's identity. Therefore, by design, a cross-site biometric attack is generally not effective given the advantages presented by the disclosed system.

Lossy Transform Guarantees One-Way Transform

Moreover, in one embodiment, if an attacker further obtains a key corresponding to a biometric hash by coercion or other means, the recovered biohash/biometric hash may still not be 100% original because the transform is lossy (i.e., information is irreversibly lost).

Lossy vs. Lossless Transform

A (forward) hash transform is lossless when the transformed hash can be reversed without any loss of information (e.g., the reverse-transformed hash will almost be a perfect copy of the original). In one embodiment, lossless transform is used by a controller to store a hash registry for back-up purposes. For example, if a back-up hash registry is compromised, or its lossy-transformed counterpart is corrupted, a reverse lossless transform can restore the back-up hash registry to generate an entirely new hash registry salted using a new key or keys.

Lossless Transform for Backing-Up Hash Registry

Because of the lossless nature of the backup hash registry, it may be further encrypted and securely stored in a hard-to-access storage medium.

Lossy Transform to Support Routine Biometric Comparison at Scale

In at least one embodiment, to support "everyday" application of identity matching (both identification and verification), a lossy-transformed hash registry may be published and assigned to a hash processor.

Unique Key and Common Key

In one embodiment, hash systems (such as the hash system 103) may be configured such that a common key may be used for a single application, or a unique key may be assigned to each user. Typically, this operational choice is determined by the below application requirements. In one embodiment, if a user can carry a physical token (e.g., a QR code) or a digital token that is stored in a smart card, then a unique key is recommended. According to various aspects of the present disclosure, the physical or digital token includes an encrypted seed which can be stored compactly. In particular embodiments, for identification scenarios, because no identity token is presented to the system, a probe biometric sample may be transformed with a common key so that it can be compared to a transformed hash registry (which is produced by the same common key). In certain embodiments, unique keys may present advantages for verification, while common keys are suitable for other processes.

Unique Key 100% Verification Rate

According to various aspects of the present disclosure, by concatenating unique non-biodata with biodata, the resultant biodata is extremely unique, thus guaranteeing 100% or nearly-100% verification performance, where the biometric recognition error in terms of Half Total Error Rate is zero. Common Key Performance is an Unbiased Estimate Performance when Unique Key is Compromised In one embodiment, if an attacker obtains/acquires the non-biodata and injects his/her own biohash, his/her attempt is likely to be successfully rejected. The performance of the biometric system in this compromised-key scenario is equivalent to the common key scenario, recalling that in this scenario, all subjects in the hash registry share the (same) common key.

Exemplary Machine-Readable Code Account Access

In one embodiment, a system "trigger" for performing the herein discussed hash transforms on biometric data may include scanning a QR bar code, a sticker, a durable item, or other machine-readable code, where the code is scanned as a request for accessing an account, third party system, or the like. For example, in various embodiments, QR codes or other machine-readable codes may include encoded information for routing a user to a unique URL (in response to scanning the code at an electronic computing device) where the user may then be prompted to take a still image or video of his/her face. In certain embodiments, the captured image may then be used for registering the user's biometric identification with a user account, or accessing an account if the biometric information matches with prior registered biometric information (e.g., a prior registered photo or hashed biometric data). In at least one embodiment, the captured biometric information, and the unique URL, may both be used as parameters for the hash transform process discussed herein. In some embodiments, the QR codes (or similar codes) may allow for approved parties to access information associated with the user. For example, the QR code may be configured to allow for medical professionals, in emergency scenarios, to access an account corresponding to the QR code.

CONCLUSION

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions include, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically includes one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

What is claimed is:

1. A method comprising:
   receiving biometric data corresponding to a user, wherein the biometric data is represented as a first vector of floating point values;
   receiving non-biometric data comprising a second vector of floating point values;

concatenating the biometric data with the non-biometric data into a third vector of floating point values;

permuting the third vector, wherein permuting the third vector comprises swapping locations of vector data elements within the third vector according to a seed associated with the non-biometric data; and scaling each vector data element of the permuted third vector according to the seed to generate a biometric template corresponding to the received biometric data.

2. The method of claim 1, further comprising:

generating a unique key associated with the received biometric data; and storing the unique key in a database, wherein the unique key is stored in association with the generated biometric template.

3. The method of claim 2, wherein the unique key is transmitted to a computing device of the user for identity verification.

4. The method of claim 3, wherein the unique key is a QR code.

5. The method of claim 1, wherein the size of the third vector of floating point values is less than a combined size of the first vector of floating point values and the second vector of floating point values.

6. The method of claim 5, wherein the size of the first vector of floating point values is 128 bytes, the size of the second vector of floating point values is 8 bytes, and the size of the third vector of floating point values is 128 bytes.

7. The method of claim 6, wherein the size of the third vector of floating point values is reduced to generate a lossy biometric template.

8. The method of claim 1, wherein the seed is generated via a random number generator.

9. The method of claim 2, wherein the database comprises a data lake.

10. The method of claim 1, wherein the biometric data comprises encoded image data captured via a computing device of the user.

11. A system comprising:

a hash controller; and a hash processor, wherein the hash processor is operatively configured to:

receive biometric data corresponding to a user, wherein the biometric data is represented as a first vector of floating point values;

receive non-biometric data comprising a second vector of floating point values;

concatenate the biometric data with the non-biometric data into a third vector of floating point values;

permute the third vector, wherein permuting the third vector comprises swapping locations of vector data elements within the third vector according to a seed associated with the non-biometric data; and scaling each vector data element of the permuted third vector according to the seed to generate a biometric template corresponding to the received biometric data.

12. The system of claim 11, wherein the hash processor is further operatively configured to:

generate a unique key associated with the received biometric data; and store the unique key in a database, wherein the unique key is stored in association with the generated biometric template.

13. The system of claim 12, wherein the unique key is transmitted to a computing device of the user for identity verification.

14. The system of claim 13, wherein the unique key is a QR code.

15. The system of claim 11, wherein the size of the third vector of floating point values is less than a combined size of the first vector of floating point values and the second vector of floating point values.

16. The system of claim 15, wherein the size of the first vector of floating point values is 128 bytes, the size of the second vector of floating point values is 8 bytes, and the size of the third vector of floating point values is 128 bytes.

17. The system of claim 16, wherein the size of the third vector of floating point values is reduced to generate a lossy biometric template.

18. The system of claim 11, wherein the seed is generated via a random number generator.

19. The system of claim 12, wherein the database comprises a data lake.

20. The system of claim 11, wherein the biometric data comprises encoded image data captured via a computing device of the user.

\* \* \* \* \*